R. S. FRAME.
Horse Hay Fork.
No. 100,518.
Patented March 8, 1870.
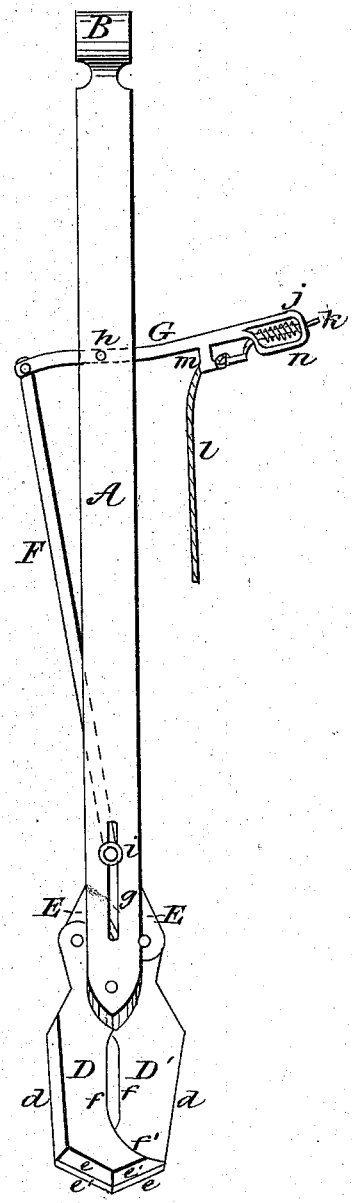
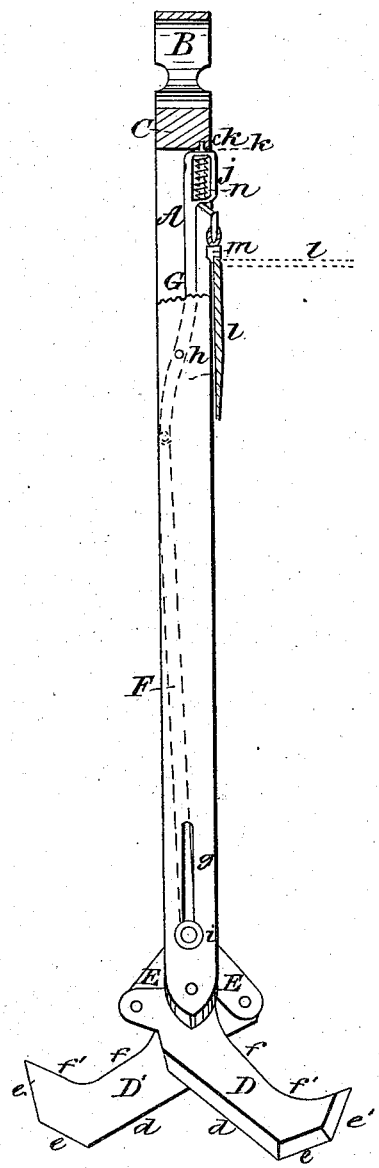

United States Patent Office.

ROLAND S. FRAME, OF WASHINGTON, OHIO.

Letters Patent No. 100,518, dated March 8, 1870; antedated December 31, 1869.

IMPROVED HORSE HAY-FORK.

The Schedule referred to in these Letters Patent and making part of the same.

To all whom it may concern:

Be it known that I, ROLAND S. FRAME, of Washington, in the county of Guernsey, and State of Ohio, have invented a new and useful Improvement in Horse Hay-Forks; and I do hereby declare the following to be a full and correct description of the same, sufficient to enable others skilled in the manufacture to which my invention appertains to fully understand and construct the same, reference being had to the accompanying drawings which make part of this specification, and in which—

Figure 1 is a side elevation of my improved horse hay-fork, the parts being in position to enter the fork into the hay, and Figure 2 is a similar view, the upper part being shown in section, and the parts being in position for the forks to lift the hay.

Like letters of reference indicate like parts in the several figures.

The nature of my invention consists, first, in the peculiar shape of the cutting and lifting-blades, by means of which the same are made to enter the hay easier and spread in the same without lifting it, as hereinafter more fully described; also, in the arrangement of the toggle-plates connecting the cutting and lifting-blades to the operating-bar, with the slots in the shank-plates, and connecting-pin traveling in the slots; also, in the device for tripping the cutting and lifting-blades.

A represents the shank-pieces, preferably in one piece, and bent at the top to form a loop, B, to which the hoisting-rope is attached.

Between the two parts below the loop B is secured a block, C, of such thickness as to keep the two shank-pieces apart sufficiently to allow the free play of the levers and blades, all of which are secured between the pieces A.

At the lower end of the shank-pieces A, and between them, are pivoted the cutting and lifting-blades D D', formed in such a manner that when in position, shown in fig. 1, their longest outer edges, d, form two cutting-lines, converging downwardly, where they end in a V-shaped point, formed by the outer edges e e' of said blades. It will be observed that the blade D is not exactly as long as blade D', for the reason that, when the fork is forced into the hay, edges e' e' of the blade D', do the cutting alone, and that were the edges e e' of both holders to enter the hay even, the cutting-edge would be too broad and thick.

The inner edges f of blades D D', are not sharp, and are almost straight the greater part of their length, but making a short upward curve, f', so as to form, when in position as shown in fig. 2, short hooks, extending upwardly.

The upper ends of blades D D' are pivoted to toggle-blades E, which, again, are pivoted to each other and the flat bar F, by means of the pin i, playing loosely in slots g, formed in the pieces A.

The flat bar F connects with a rod, G, pivoted at h between the pieces A, and extending to the opposite side, and of sufficient length to just reach under the block C when in position, as shown in fig. 2.

The free end of this rod G is formed into a loop, j, extending to one side of said rod.

Extending lengthwise through this loop, and moving in proper bearings in the same, is a latch-bolt, k, provided at its inner end with a ring, to which the tripping-rope l is attached.

Surrounding the bolt k and with its outer end attached to the same, inside the loop j, is a spring, n, which keeps the bolt always extending beyond the loop j.

A short distance below the loop j on the rod G, is formed another loop, m, through which the tripping-rope l passes, so that the bolt k may be operated, whether the tripping-rope l is in a vertical or horizontal position.

The bolt k, when in position, as shown in fig. 2, catches in a notch, c, in the block C, the lower corner of which latter is beveled off, to allow the bolt to easily enter the notch.

The operation of my device is easily understood. The parts being in position, as shown in fig. 1, the fork is depressed into the hay, the edges e e' of pieces D', entering first, and the upwardly-diverging edges d of both pieces, facilitating the entering of the blades.

When the fork has entered sufficiently deep into the hay, the rod G is elevated, thereby depressing the bar F and toggle-blades E, and forcing the blades D D' to assume the position shown in fig. 2.

The shape of blades D D', and especially the short curve f', to enable the blades to spread in the hay with very little lifting motion, so that no resistance is offered by the hay. The bolt k has at the same time caught in notch c, and thus holds all the parts rigid.

When the fork and its load of hay has reached the loft and is to be dumped, the tripping-rope l is pulled, which releases the bolt k, when the weight of the hay forces the blades D D' down into position, as shown in fig. 1, and the hay glides down over and off from the blades.

Having thus described my invention,

What I claim as new, and desire to secure by Letters Patent, is—

1. The blades D D', when constructed with outer converging-edges d d' and point edges e e', and the short inner curves f', the edges e e' of blade D', projecting slightly beyond those of blade D, and forming a V-shaped cutting-point, all arranged as shown, to operate as described.

2. The arrangement on rod G of the tripping device, consisting of loops j and m, bolt k, spring n, in combination with notch c in block C, all arranged to operate substantially as and for the purpose set forth.

ROLAND S. FRAME.

Witnesses:
ALEX'R A. C. KLAUCKE,
SAMUEL SMITH.